May 4, 1937.  F. L. FULLER ET AL  2,079,442

MANUALLY CONTROLLED SORTING MACHINE

Original Filed Sept. 7, 1934    7 Sheets-Sheet 1

INVENTORS
Frederick L. Fuller
Samuel Brand
BY
ATTORNEY

May 4, 1937.　　F. L. FULLER ET AL　　2,079,442
MANUALLY CONTROLLED SORTING MACHINE
Original Filed Sept. 7, 1934　　7 Sheets-Sheet 2
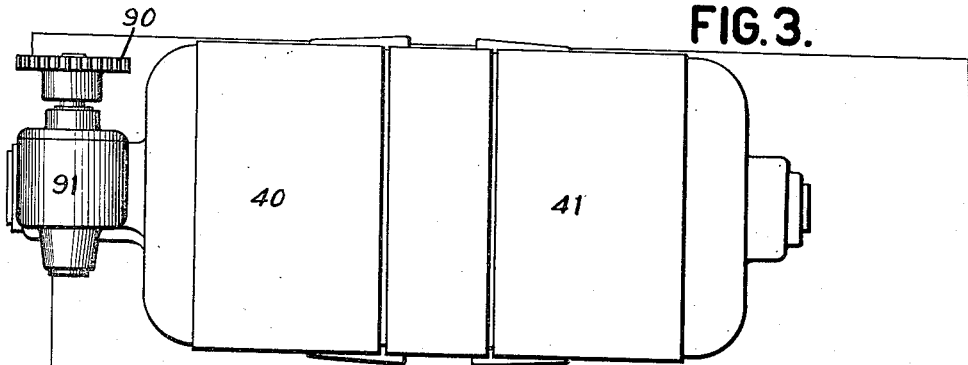
FIG. 3.
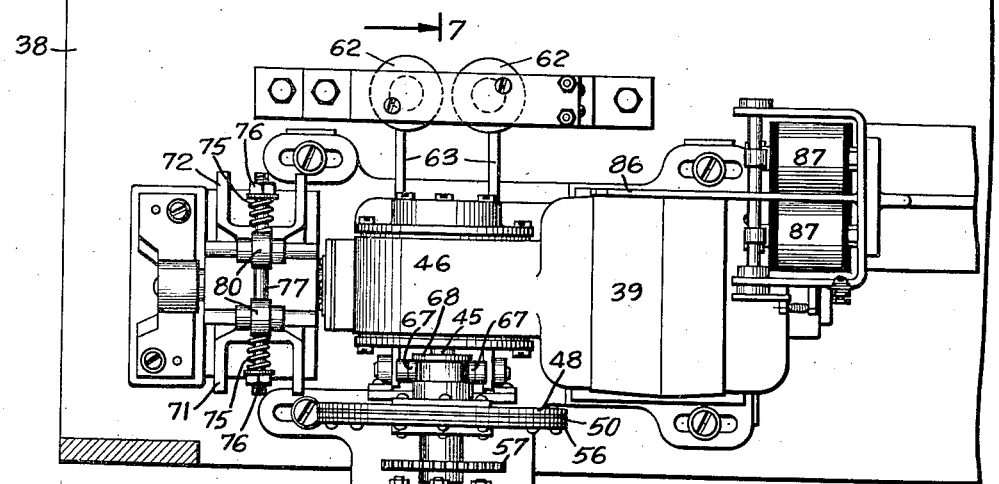
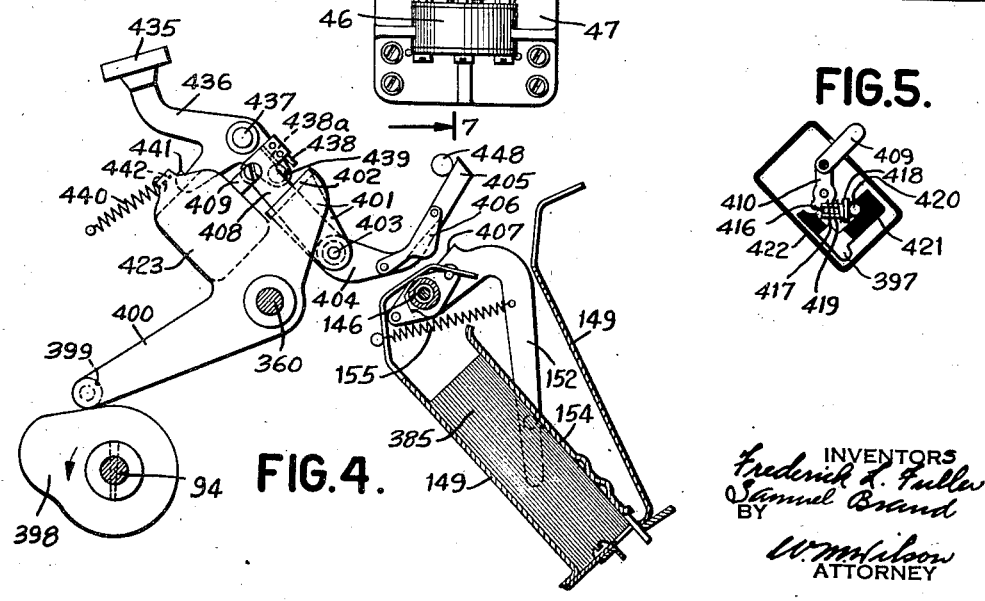
FIG. 4.　　FIG. 5.
INVENTORS
Frederick L. Fuller
Samuel Brand
BY
W. M. Wilson
ATTORNEY May 4, 1937.  F. L. FULLER ET AL  2,079,442
MANUALLY CONTROLLED SORTING MACHINE
Original Filed Sept. 7, 1934  7 Sheets-Sheet 3
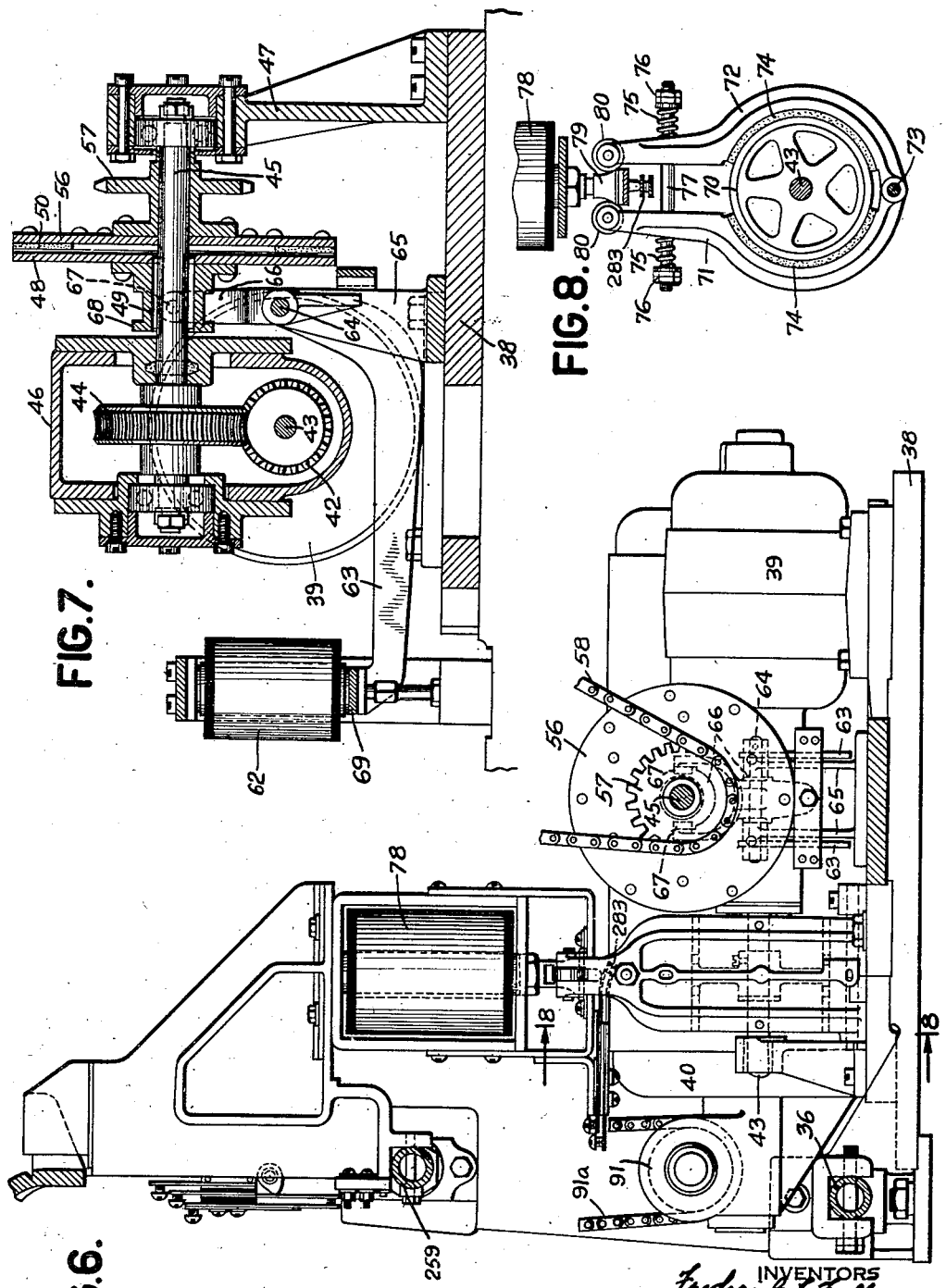

May 4, 1937.   F. L. FULLER ET AL   2,079,442
MANUALLY CONTROLLED SORTING MACHINE
Original Filed Sept. 7, 1934   7 Sheets-Sheet 4
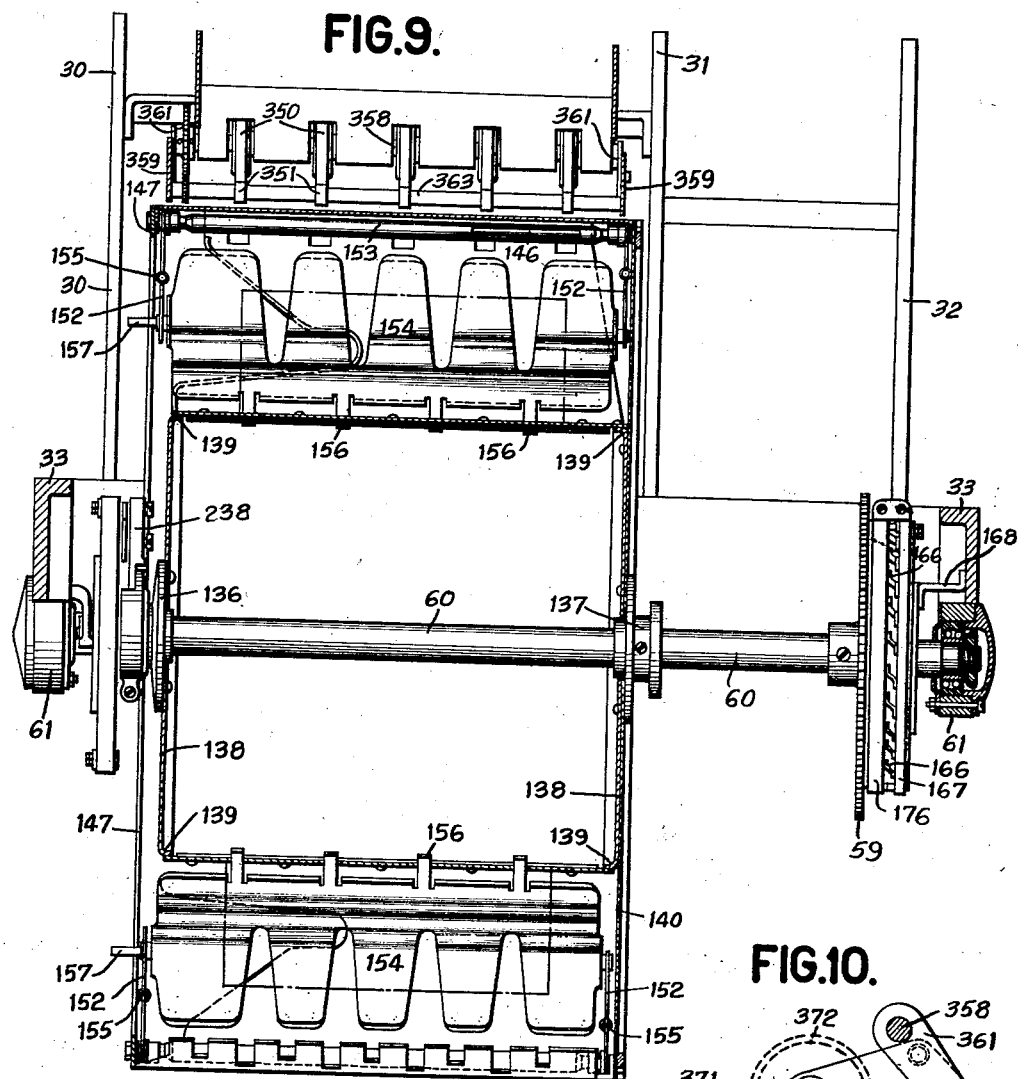
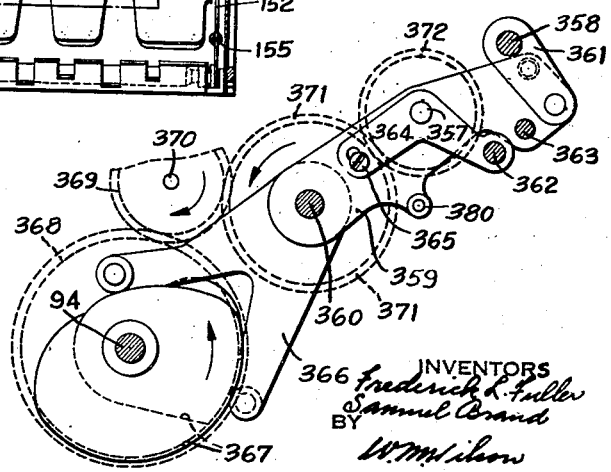
INVENTORS
Frederick L. Fuller
Samuel Brand
BY
W. M. Wilson
ATTORNEY May 4, 1937.   F. L. FULLER ET AL   2,079,442
MANUALLY CONTROLLED SORTING MACHINE
Original Filed Sept. 7, 1934   7 Sheets-Sheet 5

INVENTORS
Frederick L. Fuller
Samuel Brand
BY
W. M. Wilson
ATTORNEY

May 4, 1937. F. L. FULLER ET AL 2,079,442
MANUALLY CONTROLLED SORTING MACHINE
Original Filed Sept. 7, 1934  7 Sheets-Sheet 6

INVENTORS
Frederick L. Fuller
Samuel Brand
BY
ATTORNEY

May 4, 1937.  F. L. FULLER ET AL  2,079,442

MANUALLY CONTROLLED SORTING MACHINE

Original Filed Sept. 7, 1934  7 Sheets-Sheet 7

INVENTORS
Frederick L. Fuller
Samuel Brand
BY
W. M. Wilson
ATTORNEY

Patented May 4, 1937

2,079,442

UNITED STATES PATENT OFFICE

2,079,442

MANUALLY CONTROLLED SORTING MACHINE

Frederick L. Fuller, West Orange, N. J., and Samuel Brand, Binghamton, N. Y., assignors to International Business Machines Corporation, New York, N. Y., a corporation of New York Original application September 7, 1934, Serial No. 743,044. Divided and this application July 31, 1935, Serial No. 34,019

19 Claims. (Cl. 129—16.1)

This invention relates to manually controlled sorting machines and has for its main object the improvement of machines of this general type to attain the segregation of groups of records such as bank checks, for example, quicker and more efficiently than has been possible heretofore.

This application is a division of the application of F. L. Fuller and S. Brand, Serial No. 743,044, filed September 7, 1934, Combined record sorting and accounting machines. Prior to the present invention check sorting machines of the manually-controlled type have been designed and constructed to cause the drum carrying sorting compartments to be rotated in the shorter of two directions to select a compartment by a minimum movement of the drum. The speed of rotation of the drum gradually increased as its inertia was overcome and it was especially noted that whenever the drum rotated through its longest arcuate movements the high speed of the drum was detrimental to the machine when the drum was stopped at the desired position by obstructing its rotation. In the present construction a maximum torque is initially applied to quickly rotate the drum but by the provision of suitable braking devices the speed of the drum is gradually reduced, facilitating its stopping.

The main object of the invention is, therefore, the provision of improvements to change the speed of rotation of the drum. In the present arrangement this is effected by a reversal of the motor current to cause dynamic braking and also by the provision of an electrical resistance in the motor circuit and a mechanical friction brake.

The reversal of current and the insertion of electrical resistance takes place irrespective of the direction of rotation of the electrical motor and when the drum approaches its desired position. The mechanical brake also functions to hold the drum in its desired position of adjustment but it is released upon the depression of a subsequent key.

A still further object of the present invention is to eliminate the provision of the automatically operated selector key releasing devices. A novel construction of the present machine permits a depressed key to be retained depressed and until another key is depressed at which time it is automatically released. The depression of a key indicates that its compartment is at a position to receive a check and eliminates the necessity of depressing the same key successively to feed checks of the same classification. The compartment selecting device is so constructed that the mechanical friction brake is held effective to hold the drum but is released when a new key is depressed.

A still further object of the invention is to provide an improved arrangement which prevents further check feeding or compartment selecting operations when any compartment is filled to capacity. Heretofore, in one construction, this object was attained by limiting the number of selector key depressions but this construction was open to the objection that additional checks might be passed to a compartment already filled to capacity. The present arrangement effectively prevents any attempt to accomplish this.

In the present machine after each check feeding operation suitable testing devices operate to determine the number of checks in the compartment. The approach to a limiting number causes the locking of a manually operated release bar which controls check feeding operations, and prevents the effectiveness of the selector keys to select subsequent compartments. The release bar and selector keys are effective again only when the checks of the filled-up compartment are withdrawn and a special key is depressed.

In connection with the check feeding devices the present machine includes improved constructions to facilitate feeding of the checks. The sorting compartments in the present machine are open at their concentric outer portions but the checks therein are prevented from falling out during the rotation of the drum by clamping or gripping means, one in each compartment.

A still further object of the present invention is to provide a common electrical means for locking the release bar during the rotation of the drum or when any compartment is filled to capacity.

In connection with the driving mechanism the present arrangement comprises a reversible motor for rotating the drum and a uni-directionable rotatable motor which in the present machine drives the check feeding mechanism and continually drives a generator to supply direct current to the electrical circuits at a voltage reduced with respect to the power supply. In prior arrangements these electrical circuits were energized by voltages of the common power supply requiring high voltage relays, circuit breakers, etc., thus creating objectionable electrical conditions.

Other objects and advantages will appear from the following specification and drawings in which drawings:—

Fig. 3 is a top plan view of the driving mechanism.

Fig. 4 is a detail view of the full compartment signal and locking devices.

Fig. 5 is a detail view of the full compartment switch.

Fig. 6 is an enlarged view in elevation of the driving mechanism for the drum.

Fig. 7 is a sectional view of part of the drum driving mechanism and is taken on the line 7—7 of Fig. 3.

Fig. 8 is an enlarged detail sectional view taken on the line 8—8 of Fig. 6 showing the mechanical brake for the sorting drum.

Fig. 9 is a sectional view taken vertically through the sorting drum.

Fig. 10 shows the construction of the feed roller frame and operating mechanism therefor.

*General description*

Figure 1:
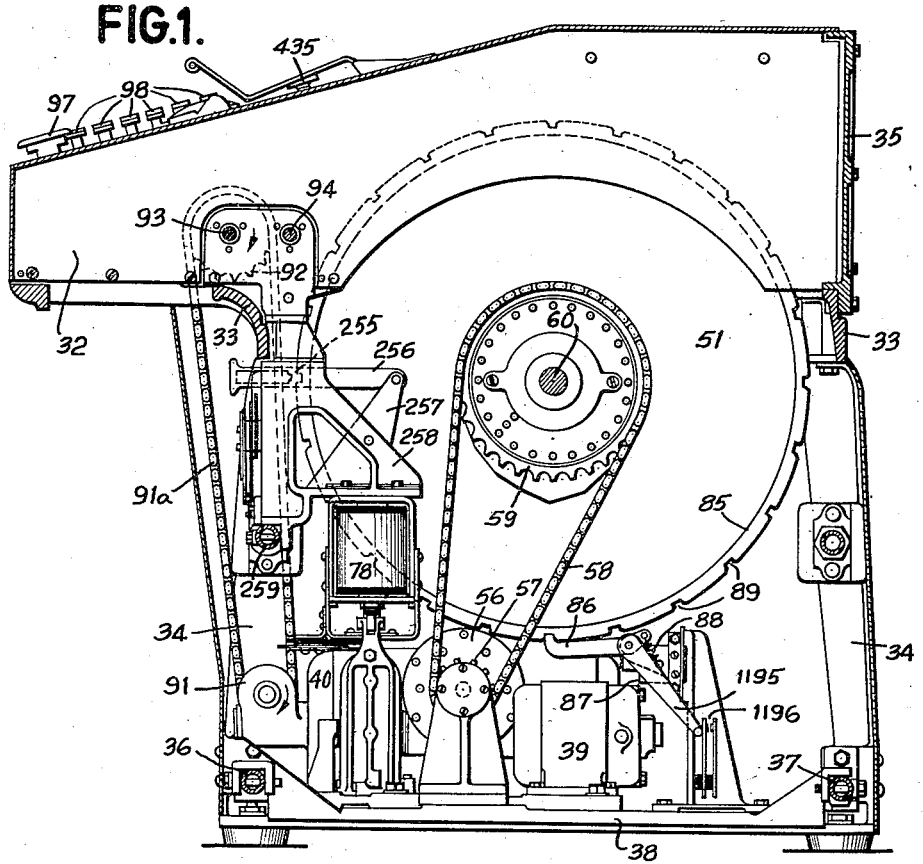
Fig. 1 is a view in right elevation of the improved machine with the side plate of the cabinet removed to show parts within.

The herein disclosed machine is designed to successively sort under manual control a group of promiscuously arranged checks. The sorting drum is rotated under control of selector keys to bring by means of a power drive a selected compartment into registration with a check receiving aperture. The check is then dropped into the aperture and by means of a manually depressible release bar check feeding devices are then operated to feed the check into the selected compartment.

Depression of one of the selector keys determines the point at which the sorting drum is to be stopped, the drum always rotating from the point at which it was last stopped the shorter distance to bring the selected compartment to the check receiving aperture.

The sorting drum is retained in its position of adjustment so that if a compartment is in the desired check receiving position all that is necessary to feed another check to this compartment is to place the check in the receiving aperture and depress the release bar.

Each selector key when depressed is retained in depressed position until the next key is depressed when it is automatically released. The depressed position of the key indicates which compartment is in check receiving position.

Depression of a key causes the power drive to automatically rotate the drum and the power drive is so designed that it causes the drum to be rotated at one speed and when the compartment approaches the desired position the speed is reduced. This reduction of speed is accomplished by dynamic braking of the motor, i. e., the current is reversed and also by the insertion of a resistance in the motor circuit.

In addition to both of these braking devices a mechanical brake operates to slow the rotation of the drum but this brake is effective to hold the drum in the desired position of adjustment.

When any pocket is completely filled the release bar is locked to prevent further feeding of checks, and in fact, the selector keys are rendered ineffective to even prevent further compartment selecting operations.

An electrical interlock causes the locking of the release bar while the drum is in rotation to prevent damage to the parts which would be created by a depression of the release bar before the drum is stopped in its rotation.

*Framework (Figs. 1, 3, 6, 7 and 9)*

The main framework of the machine includes three longitudinal frames 30, 31 and 32 (Fig. 9) and mounted on a sub-base 33 (Fig. 1) which in turn is supported on legs 34. The frames 30, 31 and 32 are joined by a back frame 35. The front legs 34 are joined by a rod 36 and the back legs 34 are joined in a similar manner by a rod 37. These rods support a base or platform 38 (Figs. 1, 3, 6 and 7) upon which is mounted the drum controlling mechanism.

*Drive mechanism (Figs. 1, 3, 6, 7, 8, 11)*

Separate electric motors are provided to drive the machine. One of these motors 39 (Fig. 1) drives the sorting drum. The other motor 40 (Fig. 3) drives the check feeding mechanism.

The motor 40 (Fig. 3) also drives a generator 41 directly connected thereto for the purpose of supplying low voltage current to operate the several relays and other electrically operated devices with which the machine is provided and which will be described in detail later in the specification.

The motor 39 is reversible in order to drive the sorting drum from the position in which it was left at the last operation through the shorter distance to a selected position.

The sorting drum indicated generally at 51 (Fig. 1) is driven by the motor 39 through a gear 42 (Fig. 7) secured on the armature shaft 43. This gear drives a gear 44 fast on a shaft 45 suitably mounted in a gear housing 46 forming a part of the motor frame, and in a bracket 47. The motor 39 and the bracket 47 are mounted on the base 38 (see also Fig. 3). A clutch disc 48 mounted to slide longitudinally on the shaft 45 but rotatable with shaft 45 through the medium of keys or splines 49, (Fig. 7) is adapted to be brought into contact with a clutch facing 50 mounted on a clutch disc 56 loosely mounted on the shaft 45. The clutch disc 56 is secured to a sprocket gear 57 also loosely mounted on the shaft 45, and, through a chain 58, (Fig. 1) drives a larger sprocket gear 59 secured to a drum shaft 60 mounted in suitable bearings supported in brackets 61 (Fig. 9) extending downwardly from the sub-base 33.

The clutch disc 48 is normally out of contact with the facing 50 and is adapted to be brought into physical contact therewith by the energization of a clutch magnet 62 (Fig. 7). This magnet operates a pair of arms 63 fast on a shaft 64 journaled in a bracket 65. Also secured fast to the shaft 64 is a yoke 66 (Figs. 6 and 7) the ends of which yoke carry rollers 67 projecting into an annular groove in the hub 68 of the clutch disc 48.

Obviously, when the magnet 62 (Fig. 7) is energized it attracts its armature 69 which is secured to the arms 63 rocking these arms, the shaft 64 and the yoke 66 slightly clockwise (as viewed in Fig. 7), shifting the disc 48 into close contact with the facing 50 so that the rotation of shaft 45 is transmitted to the sprocket 57 to frictionally drive the sorting drum.

As will be fully explained later in connection with the description of the circuit diagram, the motor 39 may operate in either direction under the control of the selector keys in order to rotate the sorting drum the shorter distance to the selected position.

A brake mechanism is provided for the purpose of decreasing the speed of the drum as it nears the selected position. This brake mechanism includes a brake drum 70 secured on the armature shaft 43 of the drive motor 39 (see Figs. 3 and 8). A pair of brake shoes 71 and 72 pivoted on a common rod 73 and embracing the drum 70 are provided with suitable linings 74. The brake shoes 71 and 72 normally press their linings against the drum 70 under the influence of springs 75 compressed between retaining nuts 76 on the ends of a rod 77 and the upward extending ends of said shoes 71 and 72. When at the proper time, as will be described later, the brake magnet 78 is energized it attracts its armature drawing a truncated cone 79 mounted on the lower end thereof, upwardly between rollers 80, there being a roller 80 mounted in the bifurcated upper end of each of the brake shoes 71 and 72, thus spreading the brake shoes and releasing the drum 70 for rotation. At approximately the time the selected pocket is at the desired position the magnet 78 is deenergized which releases the brake shoes for action of their springs 75. This immediately brings the brake lining into effective contact with the drum 70 to stop the rotation of the sorting drum.

In addition to the application of the brake to drum 70, other means is provided to act as an effective brake for the purpose of stopping the drum. This means includes momentary reversal of the current through the field windings of the motor 39. The manner in which this reversal is accomplished will be fully brought out in connection with the description of the circuit diagram. It may also be stated that following the momentary reversal of the current through the motor a resistance is automatically placed in the motor circuit which has the effect of causing the motor to run at reduced speed until the sorting drum is accurately positioned. When this occurs, that is, when the drum 51 is brought to rest in its selected position a locking finger 86 (Fig. 1), which was withdrawn at the beginning of the operation by the energization of magnets 87, is released and its spring 88 rocks said finger into engagement with one of a plurality of spaced alining notches 89 located about the periphery of a ring 85 secured to the drum 51.

The motor 40 (Figs. 1, 3 and 6) as stated above, drives the generator 41 and in addition drives a sprocket gear 90 through reduction gears enclosed in a housing 91. The sprocket gear 90, by means of a chain 91a, rotates a sprocket gear 92 (Fig. 1) secured to a main drive shaft 93 mounted in the frames 30, 31 and 32. The drive shaft 93 rotates continually while the machine is in operation and drives a main cam shaft 94 by means of a gear 95 (Fig. 11) fast on the drive shaft 93 meshing with a larger gear 96 rotatably mounted on the cam shaft 94. A one revolution clutch is provided and is rendered effective, under the control of a release bar 97, to couple the cam shaft 94 to the gear 96 whereby the shaft 94 receives one complete counterclockwise (Fig. 11) rotation at each check feeding operation. This clutch and release bar will be described later.

Figure 12:
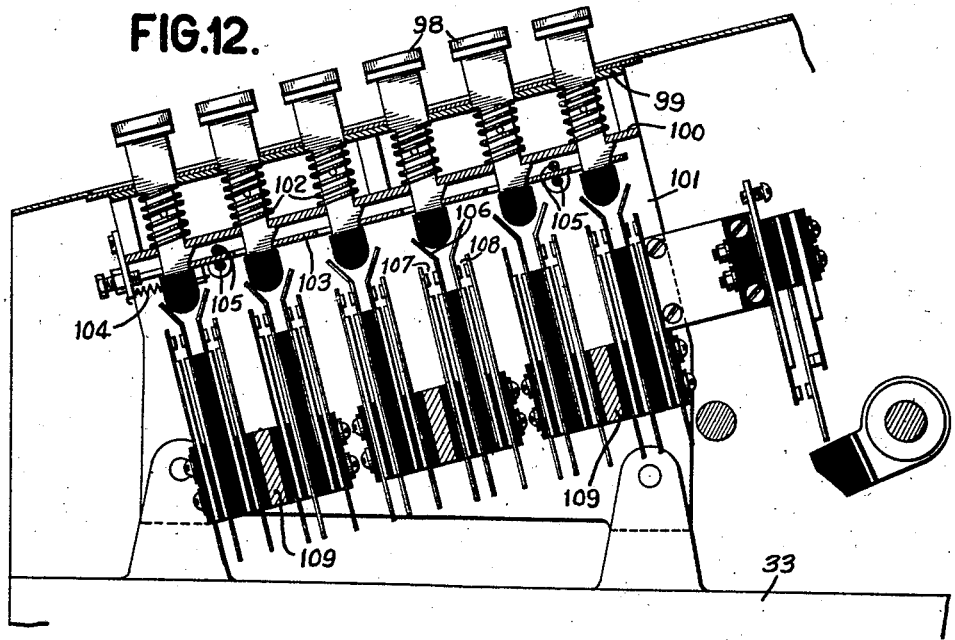
Fig. 12 is a sectional view showing in elevation one bank of compartment selecting keys.

*Keyboard (Figs. 1 and 12)*

A brief description will now be given of the various manipulative devices provided for controlling the machine. The sorting drum, indicated generally at 51 (Fig. 1), has twenty-four compartments into which checks may be sorted. In order to select the particular compartment into which the check is deposited and to control the rotation of the drum to bring the selected compartment into position to receive the check a plurality of selector keys 98 (Figs. 1 and 12) arranged in four banks of six keys each is provided. These keys are slidably supported in plates 99 and 100 carried between frames 101 (only one of which is shown) mounted on projections on the sub-base 33. Springs 102 compressed between the plate 100 and the shoulders on the key stems normally hold the keys 98 in the upward position.

The key caps carry suitable indications to designate the compartments according to the classification numbers, letters, etc. of the checks or vouchers to be sorted. For illustrative purposes, however, the keys 98 have been given numbers from 1 to 24 to correspond with the numbers of the compartments on the drum 51.

Upon depression of a key 98 a projection on the stem thereof cams a detent 103 toward the right (Fig. 12) until the shoulder of said projection passes below the detent whereupon a spring 104 restores the detent to latch the key in depressed position. The detent 103 is in the form of a large single flat apertured plate and is supported between pairs of rods 105 extending between the frames 101. The depressed key is held by the detent 103 until another key is depressed which shifts the detent releasing the previously depressed key. The keys 98 may not otherwise be released.

Each of the keys 98 carries at its lower end a rounded block of insulation which, upon depression of a key, is thrust between contact blades 106 to close two pairs of contacts 107 and 108, there being a set of contacts 107 and 108 provided for each key 98. The blades upon which the contacts 107 and 108 are carried are suitably mounted on bars 109 supported between the frames 101. The contacts 107 and 108 are connected by suitable wires to the sorting drum control device which will be described later.

*The sorting drum (Figs. 1, 9, 14 and 16)*

Figure 16:
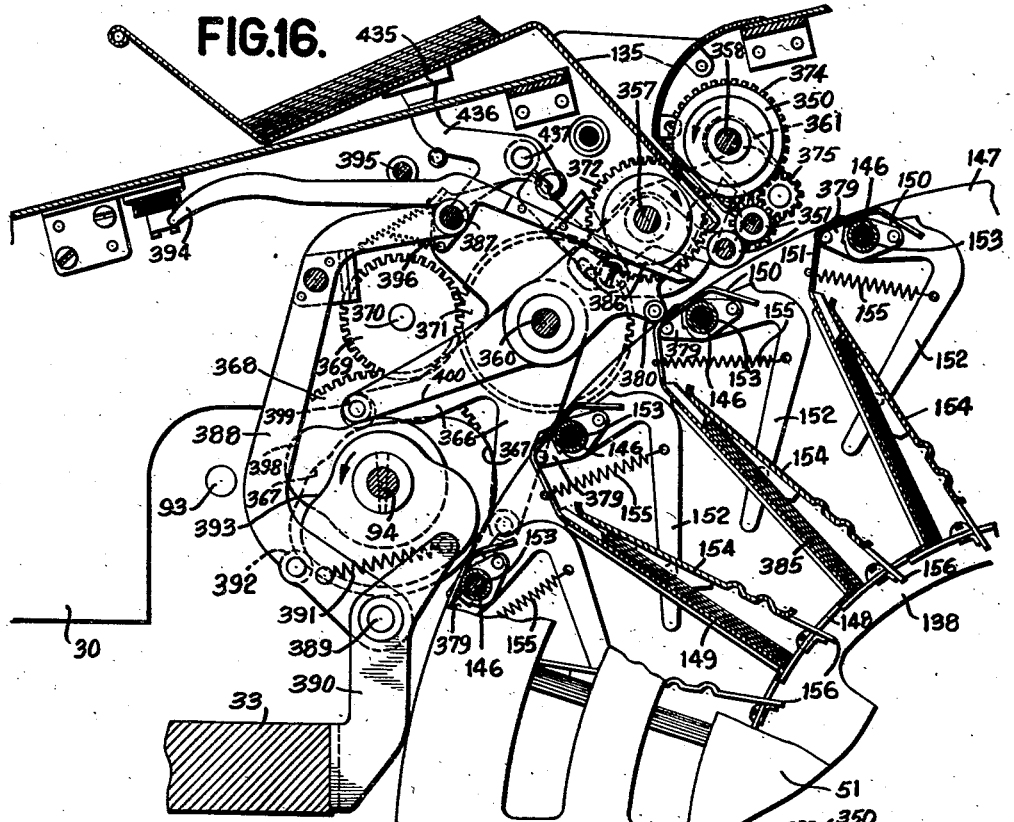
Fig. 16 is a detail sectional view of the devices for entering checks into the selected compartment but shown in normal position.

It was described above how the shaft 60 (Figs. 1 and 9) is mounted in the frame 33 and how this shaft is rotated by the motor 39 by means of the chain 58. The shaft 60 supports and rotates the sorting drum in the following described manner:

Secured to the shaft 60 are two flanged hubs 136 and 137 (Fig. 9) to the flanges of which hubs are secured discs 138 having flanged rims 139. A larger disc 140 is secured to the right hand disc 138 (Fig. 9) and carries near its outer edge a series of lateral projecting rods 146 (see Fig. 16). At their opposite ends the rods 146 are secured to and spaced apart by a ring 147 (Figs. 9 and 16). To form the individual compartments into which the checks are to be sorted light metal plates are secured to the flanges 139 and extend a suitable distance around the circumference of said flanges to form the bottoms as at 148, each of the parts 148 overlapping its neighbor. The plates are then bent outwardly to form radial separators 149 for the compartments. Near their outward extremity the plates are bent toward their respective rods 146, then, passing over these rods, said plates are bent slightly inward, these bent portions 150—151 forming apertures through which the checks are fed into the compartments. Ears are bent outwardly from the separator plates 149, one near the ring 147 and one near the disc 140 and holes therein receive the rods 146 to maintain the separators 149 properly spaced.

Near each end of the rods 146 are pivoted angular arms 152 which arms are joined by sleeves 153 surrounding the rods. Between them each pair of arms 152 pivotally carries a check retainer or clamping plate 154 each pressed against the separator 149 at its left by springs 155 attached to the arms 152. Projections 156 on the lower edges of the plates 154 extend through slots in the bottom of the compartments to limit the movement of the inner edges of said plates 154. The arms 152 are adapted to be swung counterclockwise (Fig. 16) to bring the outer edges of the plates 154 against the right hand separators 149 to permit ingress of the checks. The means for rocking the arms 152 will be described later.

Pins 157 project from the left hand arms 152 (Fig. 9) to provide a convenient means for manually rocking the retaining plates 154 in order to remove the checks from the compartments.

*Compartment selection (Fig. 15)*

It was previously stated that the selection of the check compartments in the sorting drum 51 is controlled by depression of the selector key 98 corresponding to the compartment it is desired to bring into position to receive the check. The control of the sorting drum is electrical and will be described in connection with the circuit diagram shown in Fig. 15. Depression of a key 98 completes a circuit which causes the sorting drum to rotate and determines which direction said drum will rotate.

Referring now to the circuit diagram (Fig. 15) current to operate the sorting machine is supplied from lines 158 through a switch 159 which, when closed, energizes the motor 40. This motor runs continually driving the generator 41 and the drive shaft 93 (Fig. 1). Closing the switch 159 also provides current for the motor 39 by means of wires 160 and 161 but this motor does not start until a selector key 98 is depressed due to control relays now to be described. The current for operating the several relays is supplied by the direct current generator 41, the positive lead from said generator being indicated at 162 and the negative lead at 163.

As was set forth previously there are twenty-four compartments in the sorting drum 51 and an equal number of selector keys 98 are provided to select the compartments. The blades of each inner pair of blades 106 (Fig. 12) of the switches operated by these keys are connected by a common wire 164 (Fig. 15) to the positive side 162 of the generator 41. Each of the left blades carrying one of the points of the contacts 107 is connected by a wire 165 to corresponding brushes 166. These brushes are stationary and are mounted in a suitable insulating support 167 secured to the sub-base 33 by a pair of brackets 168 (see Fig. 9). The brushes 166 are constantly in contact with a split commutator comprising separate segments 169 and 170 (Fig. 15) mounted in an insulating disc 176 (Fig. 9) secured to the sprocket 59 which, in turn, is fast on the compartment drum shaft 60. The segment 169 is electrically connected to a ring 177 and the segment 170 is electrically connected to a ring 178 both of which rings are mounted in and rotate with the disc 176.

The commutator segments 169 and 170 have a fixed relationship with the compartment drum and rotate therewith, but rotate with respect to the brushes 166 consequently the spaces between the segments 169 and 170 may be between any adjacent pair of diametrically opposed brushes 166. For the illustrative embodiment it may be noted (see Fig. 15) that one of the spaces separating these segments lies between the brushes corresponding to the No. 1 compartment and the No. 24 compartment, while the space separating the opposite ends of the segments lies between the brushes corresponding to the No. 12 and No. 13 compartments.

Depression of a key 98, for instance the "5" key, closes contacts 107 and completes a circuit from the positive side of the generator line 162 through line 164, contacts 107, the corresponding line 165, brush 166, commutator segment 169, the common ring 177, a brush 179, a wire 180, contacts 181, through the coil of a relay 182, wire 183, contacts 184, wire 185 to the negative generator lead 163. At the same time a circuit is completed through one coil 186 of a two coil relay, contacts 187, wire 185 to line 163 energizing the relay 186 which attracts its armature 188 comprising the center blade of a three blade time delay switch. This closes one set of contacts 189 completing a circuit from the positive line 162, a wire 190, closed contacts 189, a relay 191 to the negative line 163. Energization of the relay 191 closes its contacts 192 (lower left of Fig. 15) completing a circuit from the line 162, contacts 192, wire 193, normally closed contacts 249, through the brake magnet 78 (see also Fig. 6) the coil of a relay 195 and the clutch magnet 62 (see also Fig. 7).

The circuits through the clutch magnet 62 and the relay 195 are completed by wire 196, 197 and 198 directly to the negative line side 163. The brake magnet (78) circuit is completed through a wire 199, contacts 200, wires 206, 207, 197 and 198 to the negative side 163.

The operation of the brake magnet 78 (Figs. 6, 8 and 15) draws its armature including the member 79 upwardly spreading the brake shoes 71 and 72 thus releasing the brake. Energization of the relay 195 closes contacts 208 (lower right of Fig. 15), closing a circuit from the negative lead 163, contacts 208, contacts 209 closed upon energization of relay 191, to the negative side of motor control relays 210, 211, 212 and 213. The energization of the clutch magnet 62 engages the clutch 48—50 (Fig. 7) between the sorting drum motor 39 and the sprocket drive 57—58—59.

The energization of the relay 182 closes contacts 214 and 215, and opens contacts 216 completing a circuit from the positive generator lead 162, contacts 192, wire 217, contacts 218 normally closed, wire 219, contacts 215 now closed by relay 182, wire 220, normally closed contacts 221, wire 222, relay 182, wire 183, contacts 184, wire 185 to the negative lead 163, thus setting up a holding circuit through the relay 182. Another circuit is completed through contacts 192, wires 193 and 217, contacts 214 closed by relay 182, wire 223, relay coil 224, contacts 225, 226 and 184, wire 185 to line side 163. Energization of the relay 224 opens the contacts 181 thus opening the circuit from the commutator to the relay 182 to prevent any cross circuits when the commutator is in motion.

The closing of contacts 214 also completes a circuit through the magnet 87 which energizes this magnet to disengage the arm 86 (Fig. 1) from the notch 89 on the ring 85 thus freeing the drum 51 for rotation.

A circuit is completed at the same time through the contacts 215, a wire 227, normally closed contacts 228 to motor control relays 211 and 212, contacts 209 and 208 to the negative line 163. Energization of motor control relays 211 and 212 closes double sets of contacts 229 and 230 respectively completing a circuit through the motor 39 extending as follows: Positive side of the main supply line through line 160, normally closed contacts 236, contacts 230, armature of motor 39, contacts 229, wire 161 to the negative side of the main supply line 158 through switch 159.

The clutch is now effective and the motor is running to rotate the selector drum to bring the selected compartments to position which, it will be remembered, is the "5" compartment for this particular example. The drum will continue to rotate until it approaches within two compartments of the selected compartment as determined by the depressed selector key 98. A feeler or extended brush 237 (Fig. 15) carried on the end of an arm 238 and extending equal distances on each side thereof is in contact with a selected contact point 241. The arm 238 is fast on the shaft 60 (see Fig. 9) and carries the feeler 237, also a shorter feeler 239. A brush 240 carried by the arm 238 is adapted to successively wipe the contacts 241 mounted in an insulating disc 242 suitably secured to the base 33. There are 24 contacts 241 each electrically connected to the contact 108 associated with a corresponding selector key 98.

The arm 238 also carries a brush 243 in constant contact with a common ring 244 and electrically connected to the feeler 237 and 239 and to the brush 240.

When the "5" key was depressed the contacts 108 corresponding thereto were closed setting up a circuit from the positive lead 162, wire 164, contacts 108, wire 245 to the "5" contact 241. Now as the feelers 237 on the arm 238 which is rotating with the drum 51, contact with the "5" contact 241 the circuit is extended through the feelers 237, brush 243, ring 244, wire 246, through a relay coil 247, wires 206, 207, 197 and 198 to the negative generator lead 163. Energization of the relay 247 closes contacts 248 completing a circuit from the positive lead 162, contacts 192, normally closed contacts 249, contacts 248, through a relay coil 250, wires 251, 206, 207, 197, 198 to the negative lead 163. This energizes the relay 250 closing contacts 252 thus setting up a holding circuit through said relay 250, and opens the contacts 200 to deenergize the brake magnet 78 which allows the springs 75 (Fig. 8) to apply the brake.

Energization of the magnet 250 also opens contacts 236 throwing resistance 253 in series with the motor 39 thus reducing the speed of the motor.

Figure 2:
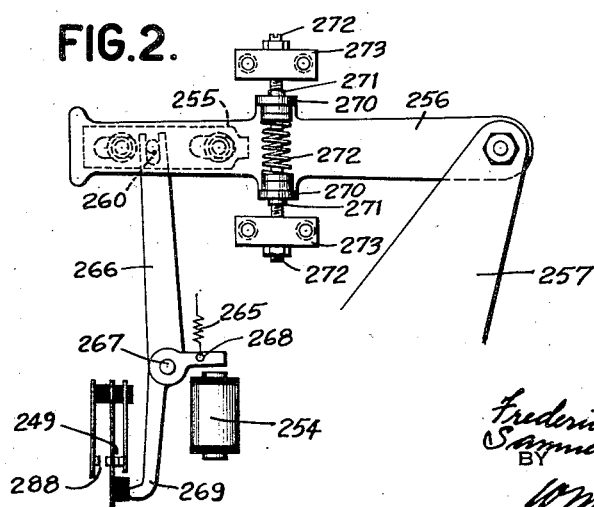
Fig. 2 is a detail of the locking bolt for the drum.

At the time the feeler brush 237 completed the above described circuit, a circuit was also completed through the "5" contact point 241, as set forth above, through wire 246, a pair of locking bolt magnets 254 (see also Fig. 2), wires 207, 197 and 198 to the negative lead 163.

At the time the feeler brush 237 wipes across the "5" contact however, the drum 51 is in a position between compartments and a bolt 255 (Fig. 2) which is adapted to be operated by magnet 254 strikes the inter-notch periphery of the ring 85 (Fig. 1) and is thus prevented from entering a notch 89 to arrest the movement of the drum and align said drum. The magnets 254 are energized only as long as the feeler brush 237 is in contact with the "5" contact 241.

The bolt 255 (Fig. 2) is slidably mounted on an arm 256 pivotally supported on a plate 257 which in turn is secured to a bracket 258 supported on a cross rod 259 extending between the left hand legs 34 (Fig. 1) of the machine. A pin 260 projecting from the bolt 255 is embraced by the bifurcated upper end of an arm 266 fast on a shaft 267 to which is also fast the armature 268 of the magnets 254 and an arm 269 which operates the sets of contacts 288 and 249. The arm 256 has two opposed ears 270 bent outwardly therefrom in which ears are loosely mounted studs 271 between the inner ends of which is compressed a strong spring 272.

In axial alinement with the outer ends of the studs 271 are two stop screws 272 fast in supporting blocks 273. suitably secured, the upper one to machine sub-base 33 and the lower one on the bracket 258. The bolt 255 may enter a notch 89 only when the drum has arrived at the selected position as will be described later.

When the relay 247 (Fig. 15) operated to close the contacts 248 a circuit was extended from line 162, contacts 192, contacts 249, contacts 248, a relay coil 274, wire 275, contacts 276, wires 277, 207, 197 and 198 to line 163. Energization of the relay 274 opens contacts 228 and 278 and closes contacts 279 and 280. Opening the contact 228 deenergizes motor control magnets 211 and 212 dropping contacts 229 and 230, at the same time closing of contacts 280 extends a circuit as follows: positive lead 162, contacts 192, wires 193 and 217, contacts 218, wire 219, contacts 215 closed by energization of magnet 182, wire 227, contacts 280, through motor control magnets 210 and 213, contacts 209 and 208 to negative lead 163. The magnets 210 and 213 now being energized, close their respective contacts 281 and 282 causing a momentary reversal of the direction of flow of the electrical current through the motor 39 for the purpose of dynamic braking.

When the brake magnet 78 is deenergized and its armature drops, it closes contacts 283 (see also Figs. 6 and 8) setting up a circuit from line 162, contacts 192, wire 193, contacts 249, contacts 283, a relay coil 284, wires 207, 197 and 198 to line 163. Energization of relay 284 closes contacts 285 setting up a holding circuit for itself extending as follows: Line 162, contacts 192, wires 193 and 217, contacts 214, wire 286, contacts 285, coil 284, wires 207, 197 and 198 to line 163.

The energization of relay coil 284 also closes contacts 287 again energizing the brake magnet 78 to release the brake shoes 71 and 72 (Fig. 8) and the energization of the relay coil 284 causes the opening of the contacts 276 deenergizing relay coil 274 which allows contacts 228 and 278 to close thus restoring the flow of current through the motor 39 to its former direction. The motor continues to run at reduced speed until the drum is in the selected position.

When the drum arrives in the selected position, which in the instant example is the "5" position, the brush 240 on the arm 238 contacts the "5" point contact 241 and it again completes a circuit through the relay 247 but this relay 247 does not at this time affect the circuit of relay 250 because the relay 250 was previously energized and set up a holding circuit for itself. However the magnets 254 are again energized and since a notch 89 is now opposite the bolt 255 (see Figs. 1 and 2) the magnets 254 rock the armature 268, shaft 267 and arm 266 to slide the bolt 255 into the notch 89. As the drum 51 at this time still has some momentum the bolt 255 and consequently the arm 256 will be carried therewith in the direction of rotation of the drum 51 compressing the spring 272 (Fig. 2) which absorbs the shock and centers the drum accurately in the selected position by retracting the drum to a predetermined position.

The magnets 254 are energized as long as a key 98 is depressed and the drum is standing in the position corresponding to the depressed key. However as soon as another key 98 is depressed the circuit is opened and the magnets 254 are deenergized and a spring 265 withdraws the bolt 255 to permit rotation of the drum to the new position.

Again referring to Fig. 2, the movement of the armature 268 also rocks the arm 269 which opens the contacts 249 and closes contacts 288 (Fig. 15) setting up a circuit extending from line 162, contacts 192, contacts 288, wire 289, relay coil 290, wire 185 to the negative line 163. Energization of relay 290 closes contacts 296 and opens the contacts 184, 226 and 225. Closing contacts 296 sets up a circuit through a coil 297 from the line 162, contacts 192, wire 217, contacts 296, coil 297 to line 163. The coil 297 thus is energized to open the contacts 221 and opens the holding circuit through the relay 182.

The opening of contacts 184, 226, and 225 opens the circuits and allows the relays 182, 224 to assume the normal original position and also prevents back circuits through coils 182, 224 and 186.

Opening the contacts 249 opens the circuit through the brake magnet 78 allowing the brake again to become effective. Also opening the contacts 249 deenergizes magnet 195 which allows the contacts 208 to open thus deenergizing the motor control magnets which in turn drop their armatures to open the motor circuit thus stopping the motor 39. Further opening the contacts 249 deenergizes the clutch magnet 62 to render the clutch 48—50 (Fig. 7) ineffective.

When the magnet 182 is deenergized dropping its armature and opening the contacts 214 the magnet 87 is deenergized (see also Fig. 1) allowing the spring 88 to engage the nose of arm 86 in a notch 89 to aline the drum in the selected position.

With the drum 51, split commutator and the rotor arm 238 standing at the "5" position let it be assumed, as a further example, that the "23" key is depressed.

Figure 15:
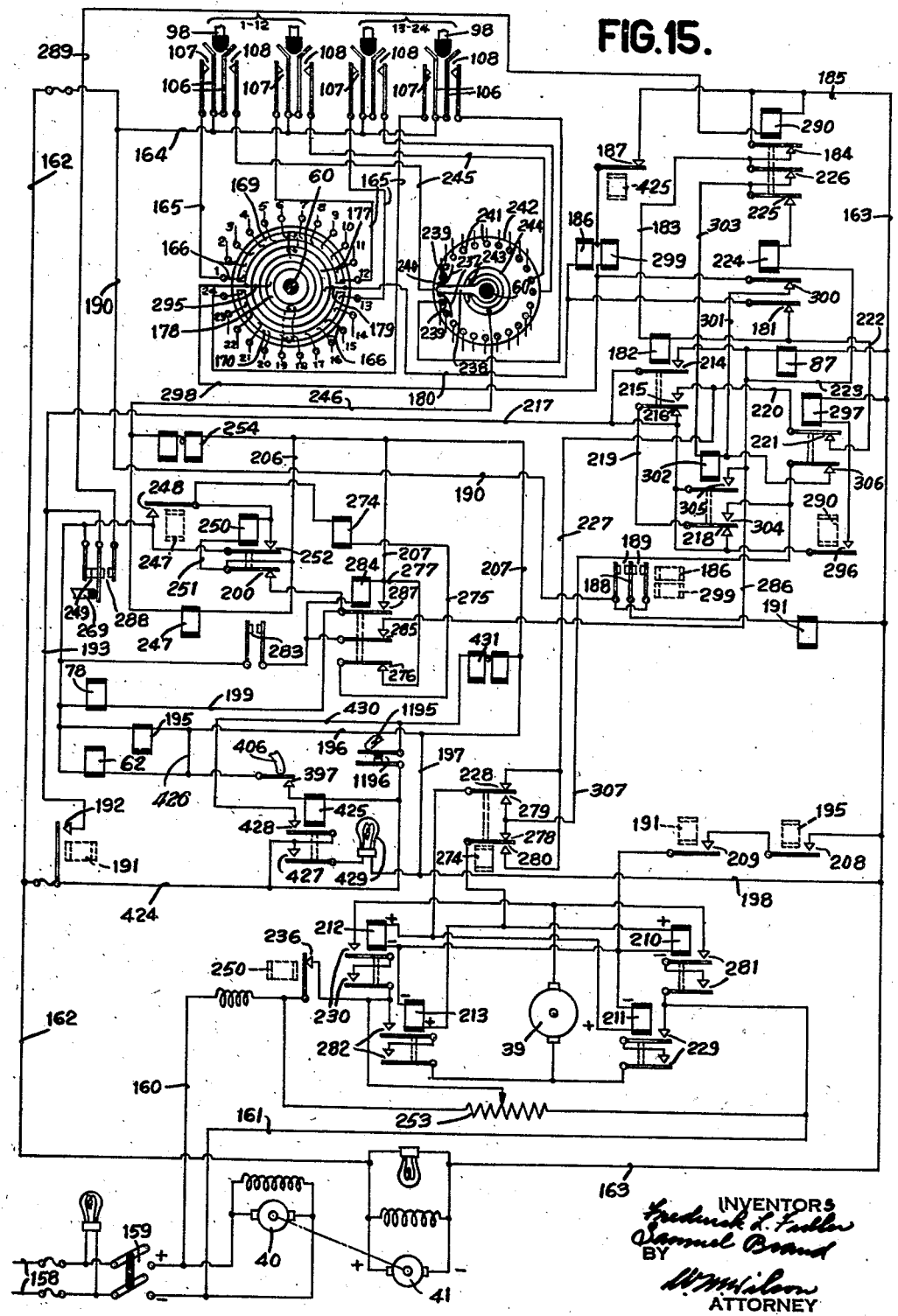
Fig. 15 illustrates the electrical wiring diagram of the machine.

Depression of the "23" key completes a circuit to the "23" brush 166 which, it will be observed by reference to Fig. 15, is in contact with the segment 170. This sets up a circuit through the "23" brush 166, segment 170, common ring 178, brush 295, a wire 298, a relay coil 299 serving the same purpose as the previously described magnet 186 and has a common outlet through contacts 187 and wire 185 to the line 163. At the same time a circuit is completed from wire 298, through contacts 300, wire 301, magnet 302, wire 303, contacts 226 and 184, wire 185 to the negative lead 163. Energization of the magnet 302 opens contacts 218 and closes contacts 304 and 305, completing a circuit from the positive lead 162, contacts 192 closed upon energization of magnet 299, wires 193 and 217, contacts 216, wire 219, contacts 304, contacts 306, magnet 302, wire 303, contacts 226 and 184, wire 185 to line 163 thus setting up a holding circuit for magnet 302.

Another circuit is completed through contacts 305, wire 223, magnet 224, contacts 225, 226 and 184 to the line 163. The relay magnet 224 opens its contacts 300 thus opening the circuit from the commutator segment 170 to the relay 302 to prevent cross circuits.

The closing of contacts 305 also energizes magnet 87 to remove the arm 86 from engagement with the ring 85 freeing the drum for rotation.

At the same time a circuit is completed through contacts 304, a wire 307, contacts 278 through the motor control magnets 210 and 213, contacts 209 now closed, contacts 208 also closed at this time, to the line 163. The magnets 210 and 213 close their respective contacts 281 and 282 energizing the motor to run in reverse direction. This rotates the drum by the shorter direction directly to the "23" pocket where it is brought to rest in the manner described above.

During the course of this rotation the space between the segments 169 and 170 passes the "23" brush 166 at which time the magnet 299 will be deenergized dropping the armature 188. At this time the armature is shifted to close the left hand (Fig. 15) contacts 189 in order to maintain the relay 191 energized and hold the circuits through contacts 192. This is only for a very brief time after which the segment 169 comes into contact with the live brush energizing magnet 186 which immediately picks up the armature 188 closing the right hand pair of contacts 189 holding the magnet 191 energized. The magnet 186 is energized as long as a key 98 is depressed. However, the motor 39 does not operate because a circuit is also maintained through the magnets 254 to hold the bolt 255 (Fig. 2) in engagement with the drum this holding the contacts 249 open and the contacts 288 closed. This maintains the magnet 290 (Fig. 15) energized holding the control circuits open.

As soon as another key 98 is depressed the circuit through the magnets 254 is opened which allows the bolt 255 to come out, and closes contacts 249 opening contacts 288. This deenergizes magnet 290 and the machine operates through the above described selecting cycle.

Figure 11:
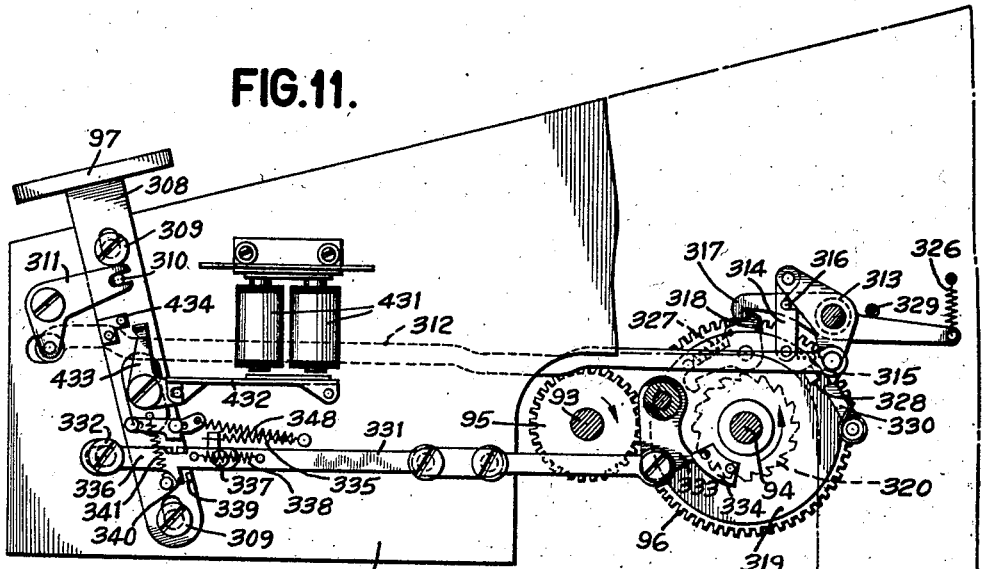
Fig. 11 illustrates in side elevation the construction of the one revolution clutch and its control by the release bar.
Figure 13:
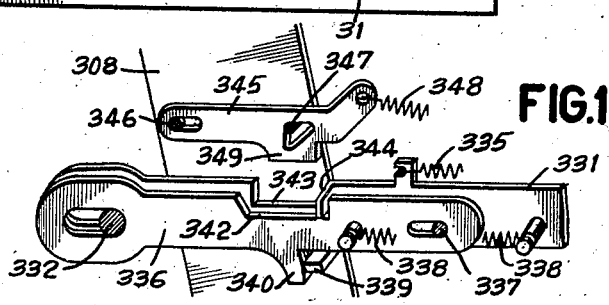
Fig. 13 is a perspective view showing in detail part of the release bar control device.

Release bar (Figs. 11, 13)

Immediately after depressing the selector key 98 the sorting drum rotates to the selected position. After this operation, the operator depresses the release bar 97 rendering a one-revolution clutch (Fig. 11) effective to impart one complete counterclockwise rotation to the cam shaft 94 in the following described manner:

It was set forth above that closure of the switch 159 (Fig. 15) energizes the motor 40 (Figs. 1, 3, and 6) which runs continuously as long as the machine is in operation and which drives the generator 41 to supply low voltage current to operate the machine. The motor 40 drives the shaft 93 (Figs. 1, 11 and 16) continuously but this shaft rotates idly until operation of the clutch mechanism illustrated in Fig. 11 is effected by depression of the release bar 97.

The bar 97 is mounted on a stem 308 which is slidably supported by a pair of headed screws 309 projecting from the frame 31. The stem 308 carries a stud 310 which is embraced by the bifurcated end of one arm of a bell crank 311 having its other arm connected by a link 312 to a lever 313 pivotally supported on the frame 31. Depression of the release bar 97 rocks the bell crank 311 clockwise drawing the link 312 leftward (Fig. 11) thus rocking the lever 313 also clockwise. This raises a link 314 depending from one arm of the lever 313. The link 314 has a shouldered notch in one edge thereof normally held by a spring 315 in cooperative relation with a stud 316 projecting from a retaining pawl 317 pivoted concentrically with the lever 313.

The pawl 317 cooperates with the tail of a drive pawl 318, pivotally carried on a disc 319 secured to the cam shaft 94, to hold said pawl 318 out of engagement with a drive ratchet 320 secured to the gear 96 and constantly rotated thereby in a counterclockwise direction (Fig. 11).

The clockwise movement of the lever 313, imparted thereto by depression of the release bar 97, as above stated, raises the link 314 which, due to the stud 316, rocks the retaining pawl 317 clockwise against the tension of its spring 326, freeing the drive pawl 318 to the action of its spring 327 which immediately rocks the pawl 318 into engagement with the ratchet 320. The disc 319 is now rotated counterclockwise one complete rotation. Shortly after the disc commences its rotation a block 328 secured to the side thereof strikes the lower end of the link 314 and rocks the link clockwise to free the pawl 317 to its spring 326 which rocks said pawl counterclockwise against a stop stud 329. Near the end of the rotation of the disc 319 and of the shaft 94 to which it is fast, the tail of the drive pawl 318 strikes the pawl 317, rocking the drive pawl 318 out of engagement with the ratchet 320 to stop rotation of the shaft 94. A spring pressed pawl 330 cooperates with a notch in the periphery of the disc 319 to prevent retrograde movement of the shaft 94.

Means is provided to hold the release bar 97 in its depressed position until the disc 319 has completed its revolution. This device includes a link 331 slidably mounted at its left hand end (Figs. 11 and 13) on a stud 332 projecting from the frame 31. The right hand end of the link 331 is pivoted to an arm 333 pivotally supported on the frame 31 and normally pressed against a block 334 on the disc 319 by a spring 335.

A slide 336 is slidably mounted on the stud 332 and on a stud 337 projecting from the link 331. A spring 338 urges the slide 336 toward the right (Figs. 11 and 13) but is prevented from shifting the slide due to a stud 339 projecting from the stem 308 of the key 97 abutting against a projection 340 on the slide 336. Upon depression of the key 97 the stud 339 is carried below the projection 340 whereupon the spring 338 draws the slide 336 toward the right until it is stopped by the studs 332 and 337 in which position the projection 340 rests immediately above the stud 339 to prevent restoration of the key 97 by its spring 341.

The upper side of the slide 336 is recessed as at 342 while a recess 343 is provided in the link 331. An ear 344 is bent at right angles from the link 331 and projects into the right hand end of the recess 342 in the slide 336. A coupling pawl 345 carried on studs 346 and 347 projecting from the stem 308 is located in the same plane as slide 336 and said pawl 345 urged toward the right and counterclockwise about the stud 346 by a spring 348, is carried downwardly upon depression of the release bar 97. At this downward movement the left hand end of the pawl 345 receives its full movement but a face 349 comes into contact with and is held in partially elevated position by the ear 344 since the link 331 has not yet been shifted toward the right. The stud 347 has moved downwardly in its triangular slot in the coupling pawl 345. As above stated, depression of the release bar effects a coupling between the disc 319 and the ratchet 320 so that these parts are rotated in unison for one rotation. As soon as the block 344 clears the arm 333 the spring 335 draws the link 331 toward the right carrying the ear 344 from beneath the face 349 and allows the pawl 345, urged by its spring 348, to drop into the recess 342.

Near the end of the rotation of the disc 319 the block 334 engages and rocks the arm 333 clockwise thrusting the link 331 toward the left and, since the coupling pawl 345 is now in the recess 342, the ear 344 on its leftward movement carries the pawl 345 and consequently the slide 336 therewith the pawl 345 sliding over its studs 346 and 347 until the projection 340 clears the stud 339 at which time the release bar is shifted by its spring 341 to its upper position carrying the pawl 345 therewith out of the recess 342. The parts are now in this normal position.

Figure 14:
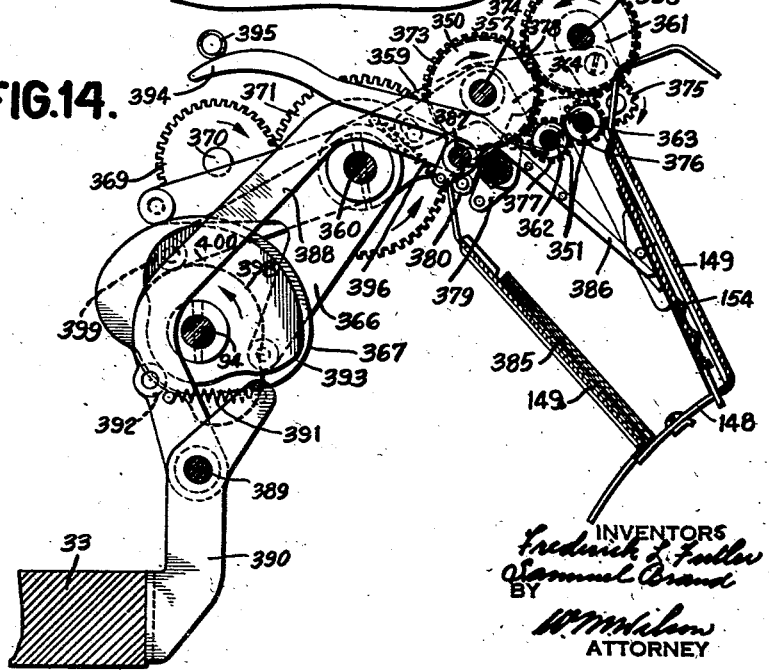
Fig. 14 is a detail sectional view showing in operated position the devices for entering checks into the selected compartment.

Check feed (Figs. 10, 14, 16)

After the drum 51 has been positioned according to the selector key 98 depressed, the check is inserted into an aperture 135 (Fig. 16) and is fed into the selected compartment. The checks are fed into the compartments by means of a plurality of pairs of feed rollers 350 and pairs of smaller rollers 351 (Figs. 14 and 16). These feed rollers normally occupy the position with relation to the sorting drum, in which they appear in Fig. 16, but upon operation of the check feed mechanism to feed a check into a selected compartment, the rollers are rocked to the positions disclosed in Fig. 14. The rollers 350 are secured to the shafts 357 and 358 (Fig. 14), the shaft 357 being carried between a pair of frames 359 (see also Figs. 9 and 10) secured to a shaft 360 journaled in the frames 30 and 31. The shaft 358 is carried between upwardly extending brackets 361 one secured to each of the frames 359. The rollers 351 are carried on shafts 362 and 363 the latter shaft being supported between the frames 359 and the shaft 362 being supported between adjustable brackets 364 pivoted on the shaft 357 and adjustably secured to the frames 359 by screws 365 (see Fig. 10).

Also secured on the shaft 360 is a cam arm 366 carrying rollers cooperating with a pair of cams 367 secured on the shaft 94 (Figs. 10 and 16) which, it will be remembered receives one complete counterclockwise rotation at each operation of the machine. At the proper time the cams 367 rock the shaft 360 and the frames 359 clockwise to bring the rollers 351 into close proximity to the selected compartment and at the same time a gear 368 (Fig. 16) fast on the shaft 94 rotates the rollers 350 and 351 in the directions indicated by the arrows through the following described train of gears: The gear 368 drives an intermediate gear 369 mounted on a stud 370 in the frame 30. The gear 369 meshes with a gear 371 loose on the shaft 360, which gear 371 meshes with a gear 372 (Fig. 10) fast on the shaft 357 back of the frame 359. A gear 373 (Fig. 14) fast to the shaft 357 on the opposite side of the frame 359 from gear 372 meshes with a gear 374 fast on the shaft 358. The counterclockwise rotation of the gear 368 through the train of gears just described rotates the gear 372, the shaft 357 and the rollers 350 fast thereon in a clockwise direction, and the gear 374, shaft 358 and the feed rollers 350 on this shaft counterclockwise. The gear 374 (Fig. 14) meshes with an intermediate gear 375 which in turn meshes with a gear 376 secured on the shaft 363, and the gear 376 meshes with a gear 377 fast on the shaft 362. This causes the feed rollers 351 on the shaft 363 to rotate counterclockwise and the rollers 351 on shaft 362 to rotate in a clockwise direction.

The rollers 350 are notched substantially as shown at 378 (Fig. 14) so that when the check is dropped into the aperture on chute 135 (Fig. 16) the lower edge thereof rests on the shoulders of the notch 378 substantially between the sets of rollers 350. The rotation of rollers 350 and 351 in the direction of the arrows feeds the checks into the selected compartment.

When the selected compartment comes into position an arm 379 integral with the arm 152 comes to rest adjacent a roller 380 (Figs. 10, 14 and 16) on the frame 359. When this frame is rocked by the cams 367, the roller 380 rocks the arms 379 and 152 counterclockwise carrying the retainer plate 154 from the position in which it appears in Fig. 16 to the position in which it is shown in Fig. 14 so that the incoming check may be fed onto the stack 385 in the proper order.

As the checks or other record materials are fed into the compartment they are held closed against the retainer plate 154 by a series of fingers 386 (Figs. 14 and 16) pivotally carried on a rod 387 carried between a pair of arms 388. The arms 388 are secured to a shaft 389 pivotally supported on brackets 390 (only one of which is shown) secured to the sub-base 33. Springs 391 normally urge the arms 388 clockwise pressing rollers 392 one carried by each arm 388, against cams 393 fast on the shaft 94.

When the shaft 94, and consequently the cams 393 are rotated counterclockwise the cams 393 permit the springs 391 to rock the arms 388 quickly clockwise from the Fig. 16 position to the position in which they appear in Fig. 14. As the fingers 386 are carried into the compartment they are guided by tails 394 thereon cooperating with grooves in a rod 395 under the influence of springs 396. After the card is fed in between the tops of the fingers 386 and the retainer plate 154 the cams 393 restore the arms 388 to their original position withdrawing the fingers 386 from the compartment. The cams 367 now rock the frames 359 counterclockwise carrying the feed rollers outwardly to their normal positions and this allows the springs 155 to carry the retainer plate 154 against the stack 385 to hold the checks in position.

Full compartment signal (Figs. 4, 5, 15)

Means is provided to prevent further compartment selecting operations when a compartmen is full of checks. This means includes contacts 397 (Figs. 4 and 5) adapted to be operated by a cam 398 fast on the shaft 94 and under the control of the arms 152 carrying the retainer plate 154. Cooperating with the cam 398 (Fig. 4) is a roller 399 on the free end of an arm 400 of a lever pivoted on the shaft 360. The other arm 401 of the lever, which arm 401 is bent back on itself as at 402 in order to clear other mechanism, pivotally carries at 403 a curved lever 404 having one of its arms 405 provided with a block 406 in the plane of a projecting surface 407 on the arm 152.

The other arm 408 of the lever 404 is connected to a link 409 which at its opposite end is connected to a lever 410. A pin 416 on the lever 410 projects into a bifurcated floating member 418 and a spring 419 compressed between the pin 416 and a shoulder on the member 418 presses a roller 420 carried by the member 418 against a curved insulating retainer 421. This switch is mounted in a casing 422 secured to an arm 423 of the lever 400—401.

When the link 409 is moved toward the left (Fig. 5) it rocks the lever 410 counterclockwise and the pin 416 rocks the member 418 clockwise about the roller 420 as a pivot until just as the pin 416 passes the center line through the pivot point of the lever 410 and the center of roller 420, whereupon the roller shifts quickly into contact with the contacts 397 of which there are two. One of the contacts 397 does not appear in Fig. 5 since it lies directly behind but insulated from the one shown. The link 409 is operated in the following described manner:

When the cams 367 (Fig. 10) operate to rock the frames 359 counterclockwise withdrawing the feed rollers 350 and 351 from the position in which they appear in Fig. 14 to their normal position (Fig. 16), the roller 380 frees the arms 152 to the action of their springs 155 which immediately rock said arms clockwise until they are arrested by the plate 154 striking the stack of checks 385. Shortly thereafter the cam 398 (Fig. 4) rocks the lever 400—401 clockwise carrying the lever 404 therewith, the lever 404 maintaining the same relation to the arm 401 and with the switch box 422 shown in Fig. 4.

On its clockwise travel the block 406 will strike the face 407, if a sufficient number of checks have previously been sorted into the particular compartment selected, and rock the lever 404 slightly counterclockwise about its pivot 403 on the arm 401. As the number of checks in the compartment increases the lever 404 will be rocked farther and farther in a counterclockwise direction until eventually the capacity of the compartment is reached at which point the movement of the lever 404 is sufficient to rock the lever 410 (Fig. 5) past center, whereupon the spring 419 acts to snap the roller 420 toward the left to bridge the contacts 397.

Referring now to the circuit diagram (Fig. 15) closing the contacts 397 completes a circuit from the line 162, a wire 424, magnet 425, contacts 397, wires 426, 196, 197 and 198 to line 163. Energization of the magnet 425 closes its contacts 427 and 428 and opens the previously described contacts 187 (top of Fig. 15 just under the figure number). Closing contacts 427 lights a signal light 429 to indicate to the operator the nature of the trouble. Closing contacts 428 sets up a circuit from line 162, wire 424, contacts 428, wire 430, coils 431, wires 207, 197 and 198 to line 163.

Referring now to Fig. 11, energization of the magnets 431 attracts the armature 432 rocking counterclockwise a pawl 433 to position the end of said pawl in the downward path of a block 434 secured to the release bar stem 308 to thus prevent depression of the release bar 97 until the checks have been cleared from the compartment.

The opening of contacts 187 deenergizes the energized magnet 186 or 299 opening contacts 189 to deenergize magnet 191 which opens its contacts 192 and 209 preventing a selecting operation of the sorting drum until the checks are removed from the full compartment.

Before the operator can proceed with an item entering operation, however, it is necessary to depress a key 435 (Figs. 1, and 4). When the cam 398 operated the lever 400—401 an ear 438 on the arm 408 of lever 404 was carried to the position indicated by dotted lines 438a to the right of a stud 439 on the key lever 436. The counterclockwise movement of the lever 404 carried the ear 438 counterclockwise almost into contact with the stud 439. Now when the cam 398 releases the lever 400—401 and the spring 440 rocks said lever counterclockwise, the ear 438 rocks the key lever 436 clockwise positioning a hook 441 in the path of an ear 442 bent at right angles to the arm 423, latching the lever 400—401 against restoring movement thus preventing operation of the link 409 to open the contacts 397.

After the operator has cleared the checks from the full compartment he depresses the key 435 rocking the lever 436 counterclockwise to free the lever 400—401 to its spring 440 which restores said lever to its normal position. As the lever 400—401 rocks counterclockwise the arm 405 of lever 404 strikes a stud 448 causing this lever to rock clockwise about its pivot 403 thus drawing the link 409 toward the right to rock the lever 410 and member 418 opposite to that previously described. Roller 420 is now shifted quickly out of contact with the contacts 397 and against the curved insulating retainer 421.

Referring now to Fig. 15, when the contacts 397 are opened the magnet 425 is deenergized opening contacts 427 and 428 and closing contacts 187. The machine may now be operated in a normal manner.

*Lock for release key (Figs. 1, 11, 15)*

Means is provided to lock the release bar 97 while the sorting drum is rotating. This lock is controlled by the locking finger 86 (Fig. 1) which is operated by the magnet 87 (see also Fig. 15).

It was explained above how depressing a selector key 98 effected energization of magnet 182 which closes contacts 214 energizing the magnet 87 through the circuit extending from line 162, contacts 192 now closed, lines 193 and 217, contacts 214, magnet 87 to line 163. Energization of magnet 87 rocks the finger 86 counterclockwise and also rocks an arm 1195 rigidly connected to finger 86 counterclockwise closing contacts 1196. Upon closing of contacts 1196 a circuit is set up from the line 162 (see Fig. 15) over wire 424, contacts 1196, release bar magnet 431, wires 197 and 198 to line 163 thus energizing the release bar magnets. Referring now to Fig. 11 it will be remembered that energization of magnets 431 through armature 432 rocks bell crank 433 counterclockwise to interpose the end of said bell crank in the path of the block 434 thus preventing depression of the release bar until the drum is stopped in the selected position.

At this time, however, as was fully explained above, the relay 182 (Fig. 15) is deenergized dropping its armature and opening contacts 214 which opens the circuit through magnet 87. The spring 88 (Fig. 1) now reengages the finger 86 with a notch 89, at the same time rocking the arm 1195 clockwise allowing contacts 1196 to open. This opens the circuit through magnets 431 (Fig. 15) which upon deenergization drop armature 432 (Fig. 11) rocking the bell crank 433 clockwise to free the release bar for operation.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a sorting machine, in combination, a frame provided with a plurality of sorting compartments, an electrical motor for moving said frame, means including sorting compartment selecting elements for causing said motor to move the frame a predetermined amount to select a compartment, and means for changing the speed of the motor to cause said frame to be moved at two different speeds during a compartment selecting operation.

2. In a sorting machine, in combination, a frame provided with a plurality of sorting compartments, an electrical motor operated by direct current for moving said frame, means including sorting compartment selecting elements for causing said motor to be set in operation to move the frame to a predetermined position to select a compartment, and electrical means effective during the movement of said frame to cause the direct current operating said motor to be reversed in polarity to effect dynamic braking.

3. In a record sorting machine, in combination, a receptacle having a plurality of sorting compartments, compartment selecting means, a reversible electrical motor under control of said selecting means for moving said receptacle in either of two directions to select a compartment by the shorter of two movements, means for inserting an electrical resistance in the motor circuit to reduce the motor speed, and means for reversing the polarity of current applied to said motor, both of the last-named means being effective irrespective of the initial direction of rotation of the motor.

4. In a machine of the class described, a rotatable drum carrying sorting compartments, means comprising a mechanical friction brake to normally hold said drum in adjusted position, means comprising a stop finger coacting with the drum to normally hold it in adjusted positions, a plurality of compartment selector keys, means effective upon the depression of a key to cause the release of both of said means and to cause a predetermined rotation of the drum, and means effective when said drum approaches the predetermined position to cause the friction brake to be effective to slow the speed of rotation of the drum.

5. In a machine of the class described, in combination, a sorting drum carrying a plurality of sorting compartments, an electric motor power drive, manually controlled means for causing said power drive to effect a predetermined rotation of said sorting drum, and a speed reducing mechanism for said drum comprising a friction brake and an electric resistance, and means effective during the rotation of said drum to apply said brake and insert electrical resistance in the motor circuit.

6. In a sorting machine, in combination, a reversible electrical motor, a rotatable sorting drum carrying compartments for receiving sorted records, electrical circuits and selecting means therefor for causing the operation of said motor in either direction and to predetermine its extent of movement, a supplemental motor, means operated by the last-named motor for feeding sorted records into said compartments, a common direct current supply for both of said motors, and a direct current generator driven by one of the motors for supplying direct current to said electrical circuits at a voltage reduced with respect to said power supply.

7. In a sorting machine, in combination, a movable frame provided with a plurality of sorting compartments each opened at one end thereof, compartment selecting means for controlling the movement of said frame, an operating mechanism, means operated by said operating mechanism for feeding records through the open end of a selected compartment, means for clamping the records already sorted in the compartments, and means whereby said operating mechanism releases the clamping means of the selected compartment to receive a record.

8. In a sorting machine, in combination, a rotatable frame provided with a plurality of sorting compartments, compartment selecting means, a motor for causing a rotation of said frame an amount predetermined by said selecting means to bring a selected compartment to a predetermined position, means for feeding a record to the selected compartment, a record clamping plate in each compartment, common guide means for guiding the record which is fed adjacent the clamping plate of the selected compartment, and means for causing a movement of the clamping plate of the selected compartment to provide a record receiving space and then restoring the clamp after the record has been fed into the selected sorting compartment.

9. A sorting apparatus comprising a rotatable drum having a series of radially arranged compartments, spring-pressed clamps provided therein and adapted to clamp the record material sorted therein, and means effective after said drum is stopped at a predetermined position for actuating the clamp of a selected compartment to provide a record material receiving space.

10. In a record sorting machine provided with a compartment for receiving records, such as checks, and open at one end, a plurality of record feeding rollers for feeding a record through the compartment entrance, a record clamping means in said compartment, record guiding fingers, and means for initially shifting said clamping means and then moving said guide fingers into said compartment to guide the record fed into the record receiving space provided by the shifting of said clamping means, said guiding means being thereafter removed from said compartment as said clamping means is restored to clamp the record fed into said compartment.

11. In a machine of the class described, in combination, a plurality of record sorting compartments, a plurality of shiftable record clamping means, one in each compartment, shifting means normally out of cooperative relationship with any of said record clamping means, and means for causing the operation of said shifting means to shift the clamping means of a selected sorting compartment prior to feeding a record therein.

12. In a sorting machine, in combination, a manually controlled sorting mechanism including sorting compartments for receiving sorted record material such as individual slips, and means controlled by the slips sorted and cooperating therewith for preventing the operation of the sorting mechanism when any sorting compartment is filled substantially to its capacity.

13. In a sorting machine, a series of sorting compartments, a record material gripping means in each of said compartments adapted to grip sorted records therein and by its position determine the extent that the compartment is filled with records, a machine control device, and means for causing the gripping means of each compartment to control the operation of the machine control device.

14. In a record sorting machine, in combination, a series of compartments in which is sorted differently classified records, manually controlled means for selecting said compartments, individual means in each of said compartments for determining the extent that a compartment is filled with records, and a common machine control device operable by any of said individual means to prevent further compartment selecting operations when any one of said compartments is substantially filled to capacity.

15. In a record sorting machine, in combination, a plurality of sorting compartments, manually controlled means for selecting said compartments, manually controlled means for causing the feeding of records to be sorted into said compartments, and means for preventing the operation of the last named means and further compartment selecting operations by the first named means when any compartment is filled substantially to capacity.

16. In a record sorting machine, in combination, a plurality of sorting compartments, manually controlled means for selecting said compartments, means for feeding records to be sorted in said compartments, and means cooperating with records in the compartments and operable when any compartment is filled to capacity for preventing the operation of said feeding means and said selecting means whereby further compartment selecting and record feeding operations are prevented.

17. In a record sorting machine, in combination, a plurality of sorting compartments, a manually controlled means for selecting a compartment, means for causing records to be sorted to be fed into the selected compartment, a common control device for rendering both means ineffective when any compartment is filled substantially to capacity, and means operable after the filled-up compartment is emptied for rendering the common control device ineffective.

18. In a machine of the class described, a rotatable drum carrying a plurality of sorting compartments, a plurality of selector keys, means whereby each key when depressed remains depressed until released by another key, a plurality of means each adapted to cooperate with the drum to normally hold it in its last position of adjustment, and means under control of said keys for releasing said plurality of holding means when a key is released by the depression of another key.

19. In a record sorting machine, in combination, a plurality of sorting compartments, manually controlled means for selecting said compartments, means for feeding records to be sorted in said compartments, and means cooperating with records in the compartments and operable when any compartment is filled to capacity for preventing the operation of said record feeding means.

FREDERICK L. FULLER.
SAMUEL BRAND.